T. H. HERNDON.
Churns.

No. 153,954

Patented Aug. 11, 1874.

WITNESSES:

INVENTOR:
T. H. Herndon
BY
ATTORNEYS.

UNITED STATES PATENT OFFICE.

THOMAS H. HERNDON, OF VERONA, MISSISSIPPI.

IMPROVEMENT IN CHURNS.

Specification forming part of Letters Patent No. 153,954, dated August 11, 1874; application filed April 25, 1874.

*To all whom it may concern:*

Be it known that I, THOMAS H. HERNDON, of Verona, Lee county, Mississippi, have invented a new and useful Improvement in Churning-Machine, of which the following is a specification:

The invention will first be fully described, and then pointed out in the claim.

Figure 1:
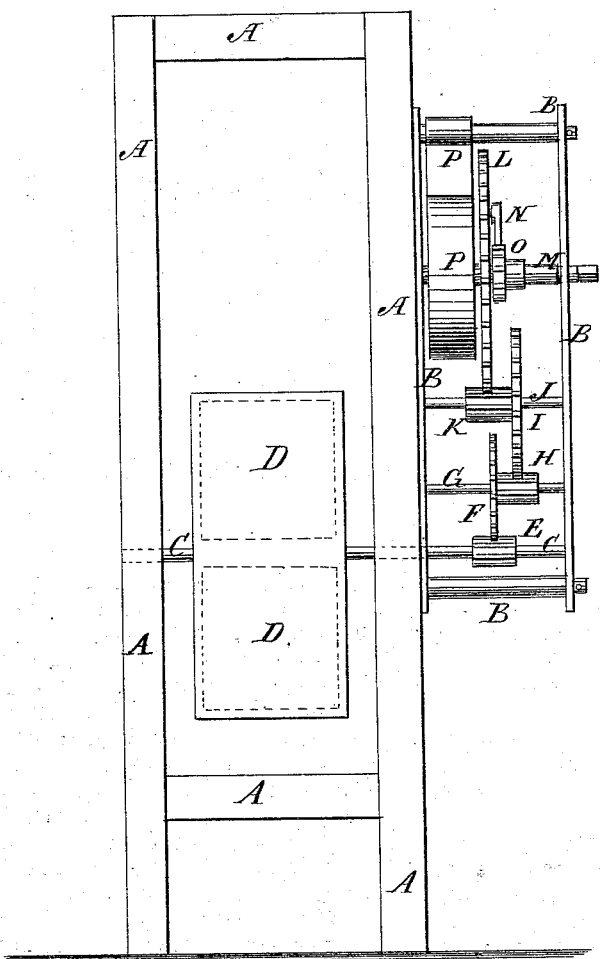
Figure 2:
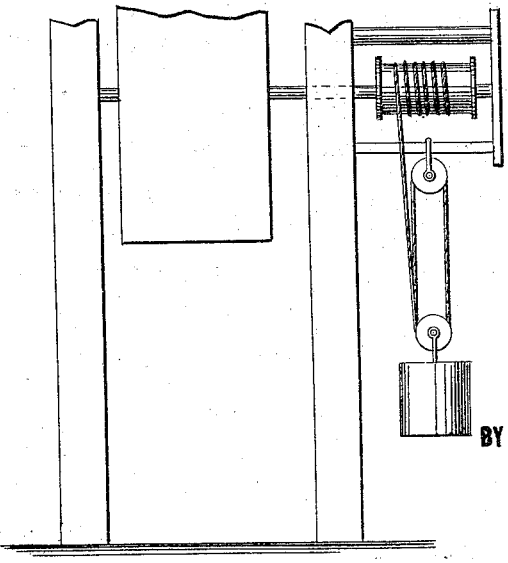

Figures 1 and 2 of drawing are elevations showing my improvement.

A represents the churn-frame, and B the frame in which is placed any suitable clock mechanism, driven by spring or weight power. C is a rotary drive-shaft, on which I place a box or milk-pan receiver, D, projecting equally on both sides thereof, and containing two opposite cavities or chambers.

In a dairy the pails or cans which contain the milk are easily kept clean and pure, while in an ordinary churn this is very difficult, requiring a person of very cleanly, thorough, and methodical habits.

A pail or can with closed top is simply made fast in each one of the hollow heads or chambers of the box D, the latter being then rotated until the butter comes.

The milk is thus unexposed to vitiated air, or to contact with surfaces calculated to impart an unpalatable taste.

In order more readily and quickly to bring the butter, I preferably use a reticulated diaphragm, which is placed detachably in the middle or about one-third of the distance from the top of the milk-cans.

The cans or pails which contain the milk, previous to being placed within the churn-box, must be closed at their tops to prevent the escape of the milk into the churn-box during the process of churning.

What I claim is—

The churning apparatus, consisting of frame A, frame B, shaft C, rotating bottom frame, the described clock mechanism, and a milk-pan receiver, having the opposite chambers D D, all substantially as shown and described.

THOMAS H. HERNDON.

Witnesses:
  J. B. HOWELL,
  JNO. G. HERNDON.